(12) United States Patent
Janz et al.

(10) Patent No.: US 6,504,669 B1
(45) Date of Patent: Jan. 7, 2003

(54) DISC DRIVE HAVING CHARGE FEEDBACK DRIVE MICROACTUATOR

(75) Inventors: Donald W. Janz, Oklahoma City, OK (US); John C. Morris, Minneapolis, MN (US); Brian G. Molloy, Natick, MA (US); David A. Sluzewski, Edina, MN (US); John S. Wright, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/329,612

(22) Filed: Jun. 10, 1999

Related U.S. Application Data
(60) Provisional application No. 60/089,341, filed on Jun. 15, 1998, and provisional application No. 60/121,149, filed on Feb. 22, 1999.

(51) Int. Cl.[7] ............................................. G11B 5/596
(52) U.S. Cl. ................................................... 360/78.05
(58) Field of Search ........................ 360/78.05, 78.12, 360/294, 294.2–294.4, 5, 106, 104, 72.2

(56) References Cited

U.S. PATENT DOCUMENTS

| 4,539,608 A | 9/1985 | Hill et al. ...................... 360/77 |
| 5,189,578 A | * 2/1993 | Mori et al. ............... 360/294.6 |
| 5,404,255 A | 4/1995 | Kobayashi et al. ...... 360/78.09 |
| 5,745,319 A | * 4/1998 | Takekado et al. ........ 360/78.05 |

FOREIGN PATENT DOCUMENTS

| WO | WO 98/20487 | 5/1998 |

OTHER PUBLICATIONS

Michael Goldfarb and Nikola Celanovic, IEEE Control, "Modeling Piezoelectric Stack Actuators for Control of Micromanipulation", Jun. 1997, pp. 69–79.

Jeffrey J. Dosch, Daniel J. Inman and Ephrahim Garcia, "A Self–Sensing Piezoelectric Actuator of Collocated Control", J. of Intell. Mater. Syst. and Struct. vol. 3, Jan. 1992, pp. 166–185.

John Main, Ephrahim Garcia and David W. Newton, "Precision Position Control of Piezoelectric Actuators Using Charge Feedback", Journal of Guidance, Control and Dynamics, vol. 18 No. 5, Sep.–Oct. 1995, pp. 1068–1073.

* cited by examiner

*Primary Examiner*—David Hudspeth
*Assistant Examiner*—Mitchell Slavitt
(74) *Attorney, Agent, or Firm*—Westman, Champlin & Kelly (57) ABSTRACT

A disc drive head positioning apparatus includes a head, a suspension which supports the head, a piezoelectric microactuator which is operatively coupled to the suspension, and a charge feedback driver which is operatively coupled to the piezoelectric microactuator. A method of positioning the head relative to a storage medium is also provided.

20 Claims, 7 Drawing Sheets

DISC DRIVE HAVING CHARGE FEEDBACK DRIVE MICROACTUATOR

CROSS-REFERENCE TO CO-PENDING APPLICATION

This application claims the benefit of U.S. Provisional Patent Application No. 60/089,341, entitled "CHARGE DRIVER CONCEPT FOR A MICROACTUATOR," filed Jun. 15, 1998 and U.S. Provisional Patent Application No. 60/121,149, entitled "CHARGE FEEDBACK CONTROL OF MICROACTUATOR USING PIEZOELECTRIC DEVICES IN A DUAL-STAGE DISC DRIVE SERVO SYSTEM," filed Feb. 22, 1999.

BACKGROUND OF THE INVENTION

The present invention relates to data storage systems and, more particularly to the use of microactuators in a disc drive head positioning apparatus.

Disc drive data storage systems use rigid discs which are coated with a magnetizable medium for storage of digital information in a plurality of circular, concentric data tracks. The discs are mounted on a spindle motor which causes the discs to spin and the surfaces of the discs to pass under respective disc head sliders. The sliders carry transducers which write information to and read information from the disc surfaces. The slider and transducer are often together referred to as a "head". Each slider is supported by a track accessing arm and a suspension. The track accessing arms move the sliders from track to track across the surfaces of the discs under the control of electronic servo control circuitry for track following operations.

The suspension connects the track accessing arm to the slider. The.suspension provides a preload force through a relatively rigid load beam which forces the slider toward the disc surface. Additionally, the suspension is flexible in the slider pitch and roll directions to allow the slider to follow the disc topography. This pitch and roll flexibility is obtained from a gimbal structure, which can be integral with the load beam or a separate piece part that is welded to the load beam.

Microactuators have been proposed for providing "fine" position control of the slider and transducer in disc drive servo systems. These microactuators have been positioned at various locations along the suspension or between the suspension and the head. Microactuated suspensions often use piezoelectric devices, which exhibit a change in length with a change in an applied voltage. This change in length is used to move the slider and transducer relative to the disc surface. However, piezoelectric devices are also known to exhibit hysteresis when driven with a voltage control driver. Hysteresis is particularly troublesome in disc drive servo systems since it limits the accuracy at which the head can be positioned within a desired data track.

The present invention addresses these and other problems in the prior art.

SUMMARY OF THE INVENTION

One aspect of the present invention relates to a disc drive head positioning apparatus, which includes a head, a suspension which supports the head, a piezoelectric microactuator which is operatively coupled to the suspension, and a charge feedback driver which is operatively coupled to the piezoelectric microactuator.

In one embodiment, the charge feedback driver includes a position command input for receiving a position command signal, a position control output, a charge driver circuit and a charge feedback circuit. The position control output is coupled across the piezoelectric microactuator. The charge driver circuit is coupled between the position command input and the position control output. The charge feedback circuit has a charge feedback input coupled to the position control output and a charge feedback output coupled to the charge driver circuit, The charge feedback circuit is adapted to sense charge delivered to the microactuator through the position control output.

The charge feedback circuit can include a current sensing resistor, which is coupled in series with the position control output and forms the charge feedback input, and a voltage measurement circuit, which is coupled across the current sensing resistor and has a voltage feedback output which is coupled to the charge feedback output.

The driver circuit can include an operational amplifier, a pull-up transistor and a pull-down transistor. The operational amplifier has first and second amplifier inputs which are coupled to the position command input and the charge feedback output, respectively, and an amplifier output. The pull-up transistor is coupled to a first terminal of the position control output and has a control terminal which is coupled to the amplifier output. The pull-down transistor is coupled to the first terminal of the position control output and has a control terminal which is coupled to the amplifier output.

The disc drive head positioning apparatus can further include a charge reset circuit, which has a charge reset command input, and first and second switches. The reset command input receives a reset signal having an active state and an inactive state. The first switch is coupled between the position control input and the charge driver circuit and has a closed state when the reset signal is in the inactive state and an open state when the reset signal is in the active state. The second switch is coupled across the microactuator and has an open state when the reset signal is in the inactive state and a closed state when the reset signal is in the active state.

The disc drive head positioning apparatus can further include an error feedback circuit coupled between the charge feedback output and the position command input. The error feedback circuit includes an integrator, an error correction circuit and a summing element. The integrator integrates the charge feedback output for a selected time period and generates an integrator output that represents the charge delivered to the piezoelectric microactuator. The error correction circuit is coupled to the integrator output and to the position control input and is adapted to generate a correction signal that represents a comparison between a commanded displacement of the piezoelectric microactuator corresponding to the position command signal and an actual displacement of the piezoelectric microactuator corresponding to the integrator output. The summing element sums the position command signal and the correction signal to generate a corrected position command signal that is applied to the driver circuit. The error correction circuit can further include an offset control input, wherein the correction signal is adjustable through the offset control input.

In an alternative embodiment, the charge feedback circuit includes a reference capacitor and a voltage feedback amplifier. The reference capacitor is coupled in series with the piezoelectric microactuator, between first and second terminals of the position control output, and forms a reference node therebetween. The voltage feedback amplifier has a non-inverting input coupled to the position command input, an inverting input coupled to the reference node, and an output coupled to the driver circuit.

In another alternative embodiment, the charge feedback circuit includes a voltage feedback amplifier and a current mirror. The voltage feedback amplifier has an inverting input, a non-inverting input coupled to the position command input, and an output coupled to the driver circuit. The current mirror has first and second legs, wherein the first leg is coupled in series with a reference capacitor across the position control output, the second leg is coupled in series with the microactuator across the position control output, and the inverting input is coupled to a reference node between the reference capacitor and the first leg.

Another aspect of the present invention relates to a method of controlling radial position of a head relative to a storage medium in a disc drive. The method includes supporting the head relative to the storage medium, and receiving a position command signal indicative of a commanded radial position for the head. Based on the position command signal, a microactuator drive signal is generated and used to vary an actual radial position of the head through a piezoelectric microactuator. A representation of the charge delivered to the piezoelectric microactuator by the drive signal is measured, and the microactuator drive signal is varied based on the measured representation of the charge.

Another aspect of the present invention relates to a disc drive head positioning apparatus, which includes a head and a microactuator. The microactuator controls a radial position of the head relative to a storage medium through a piezoelectric microactuator element based on a position command signal and a representation of the charge delivered to the piezoelectric microactuator element.

DETAILED DESCRIPTION OF THE PREFERRED EMBODIMENTS

Figure 1:
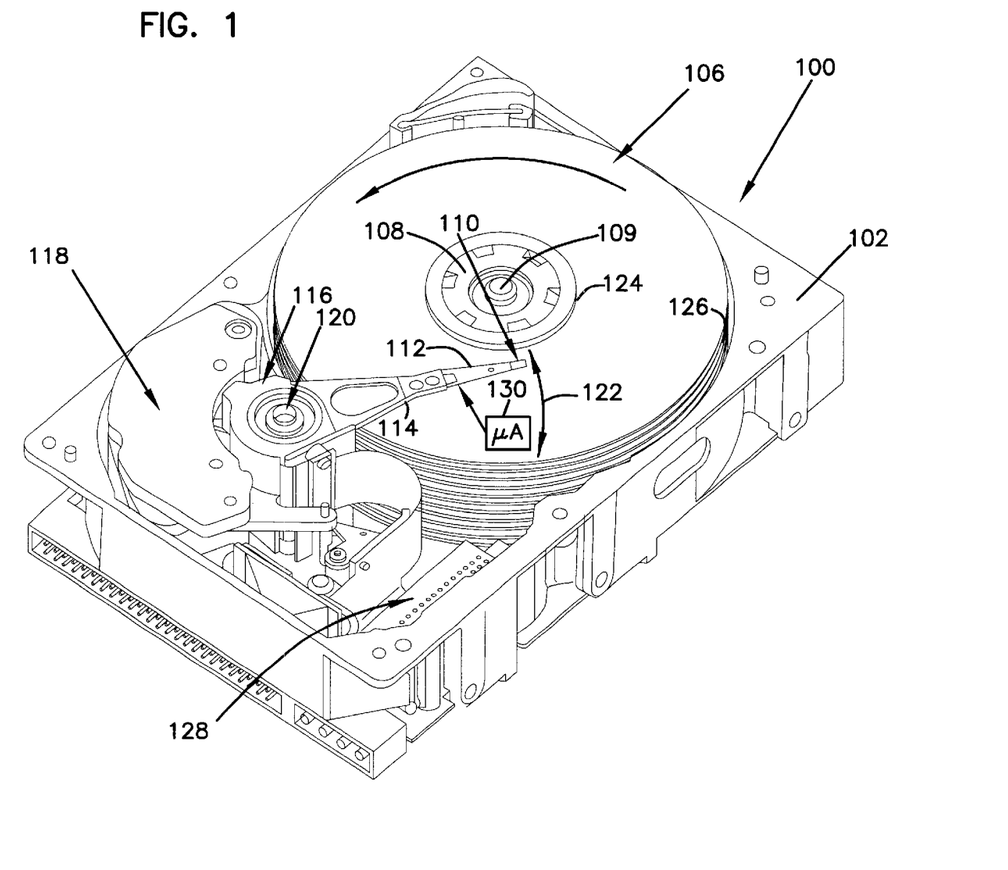
FIG. 1 is a perspective view of a disc drive in which the head positioning apparatus of the present invention can be used.

FIG. 1 is a perspective view of a disc drive 100 in which the charge feedback driver of the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs which are mounted for co-rotation about central axis 109. Each disc surface has an associated head 110 which is mounted to disc drive 100 for communication with the disc surface. In the example shown in FIG. 1, heads 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along a path 122 between a disc inner diameter 124 and a disc outer diameter 126. Voice coil motor operates under control of internal circuitry 128. Other types of actuators can also be used, such as a linear actuator.

Actuator 116 provides "course" positioning of heads 110 relative to a desired data track. Disc drive 100 further includes a piezoelectric microactuator ("$\mu A$"), shown schematically at 130, along suspension 112 which provides "fine" positioning of heads 110 relative to the desired data track. A change in the applied voltage to microactuator 130 causes a change in the radial position of the respective head 110 relative to the disc surface. In an alternative embodiment, microactuator 130 can be adapted to provide "Z-height" control, whereby a change in the applied voltage to microactuator 130 causes a change in the preload force applied to head 110 by suspension 112.

Figure 2:
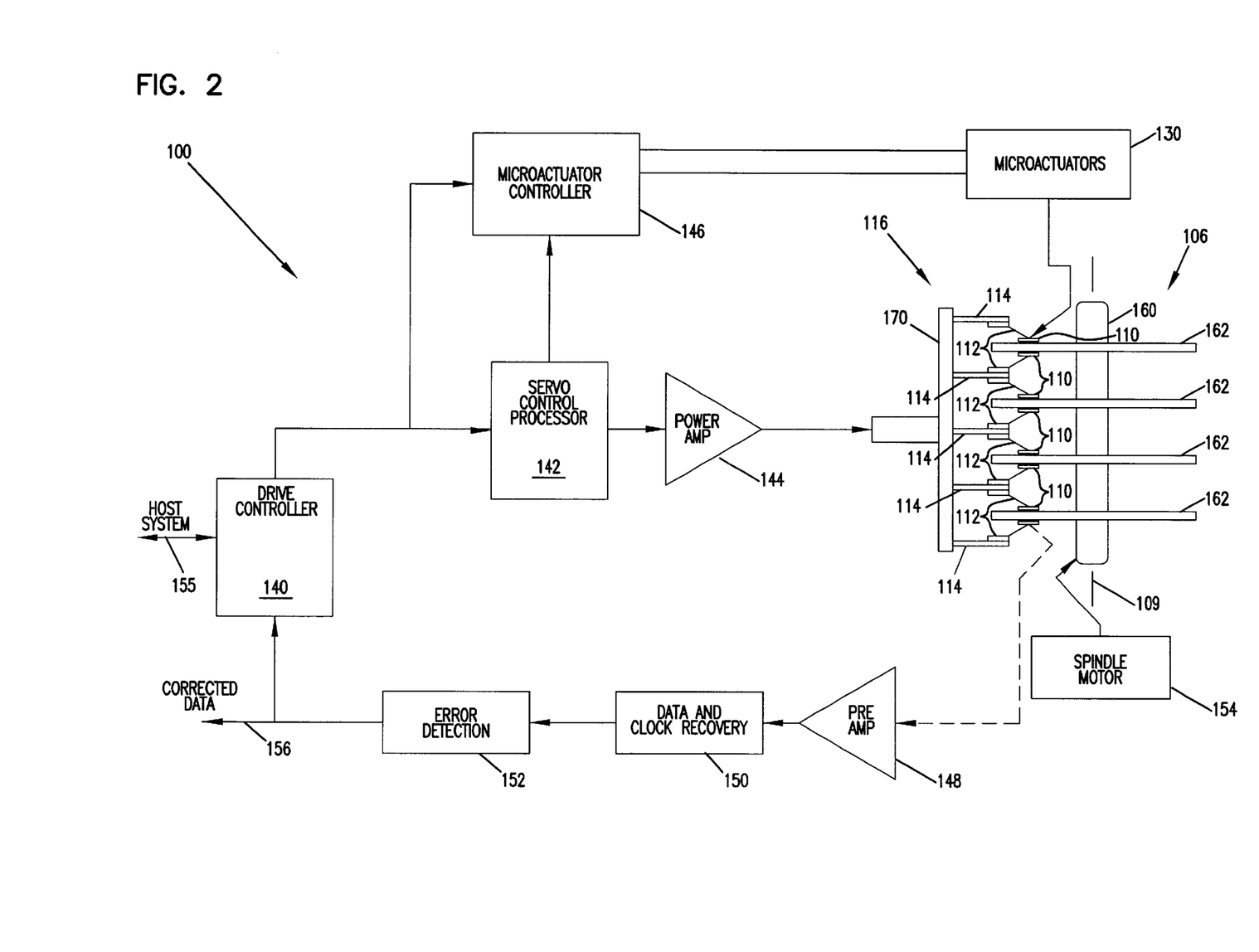
FIG. 2 is a block diagram of the disc drive illustrating servo control circuitry, according to one embodiment of the resent invention.

FIG. 2 is a block diagram of disc drive 100, which illustrates the servo control circuitry for actuator 116 and microactuator 130 in greater detail, according to one embodiment of the present invention. Disc drive 100 includes drive controller 140, servo control processor 142, power amplifier 144, actuator 116, microactuator controller 146, microactuators 130, disc pack 106, preamplifier 148, data and clock recovery circuit 150, and error detection circuit 152 and spindle motor 154. Drive controller 140 is typically a microprocessor or digital computer, and is coupled to a host system or another drive controller which controls a plurality of drives.

Disc pack 106 includes spindle 160 which supports a plurality of coaxially arranged discs 162 (for simplicity, only four of which are shown). Spindle motor 154 rotates discs 162 about axis 109. Each disc 162 has first and second surfaces with concentric data tracks for storing data in the form of flux reversals which are encoded on the tracks.

Actuator 116 includes base 170 which supports the plurality of track accessing arms 114. Each of the track accessing arms 114 is coupled to at least one of the suspensions 112, which supports a head 110 proximate to a corresponding disc surface for accessing data within the tracks on the disc surface. Each suspension 112 is coupled to at least one microactuator 130 for finely positioning head 110 within a desired track on the disc surface. The control function for microactuators 130 can be implemented within drive controller 140, servo control processor 142 or a separate microactuator controller 146, as shown in FIG. 2. Microactuator controller 146 can be mounted with the electronic circuitry 128 (shown in FIG. 1) within the disc drive housing, on actuator 116, or in-situ with each of the microactuators.

During operation, drive controller 140 receives a command signal from the host system over bus 155 which indicates that a certain portion of one or more of discs 162 are to be accessed. In response to the command signal, drive controller 140 provides servo control processor 142 with a position signal, which indicates a particular cylinder over which actuator 116 is to position suspensions 112 and their associated heads. Servo control processor 142 converts the position signal into an analog signal which is amplified by power amplifier 144 and is provided to actuator 116. In response to the analog position signal, actuator 116 positions suspensions 112 and their associated heads over the desired cylinder.

Drive controller 140 also places preamplifier 148 in a read mode and indicates which read head or heads the data will be read from. The selected read head generates a read signal containing data which was encoded on the disc surface. Preamplifier 148 amplifies the read signal and provides it to data and clock recovery circuit 150. Data and clock recovery circuit 150 recovers data from the read signal and provides the data to error detection circuit 152. Circuit 152 detects whether any errors have occurred in the data read back from the disc. Correctable errors are corrected by error detection circuit 152 and are provided to drive controller 140 over bus 156 in a known manner. Alternatively, correctable errors can be corrected by drive controller 140, or a combination of both drive controller 140 and error detection circuit 152.

In a sector servo positioning drive, for example, a portion of each sector has position information which is read by the read head and provided to servo control processor 142. The position information gives tuning feedback to the servo control processor, which corrects the analog position signal provided to power amplifier 144. The tuning feedback can also be used to update or correct a position command signal provided to microactuator controller 146 by either drive controller 140 or servo control processor 142. This position command signal can further reflect predetermined head offsets for various radial positions on the disc surface. Microactuator controller 146 receives the position command signal and drives the respective microactuator 130 to tune the radial position of the associated head 110 within the selected tack on the disc surface.

Figure 3:
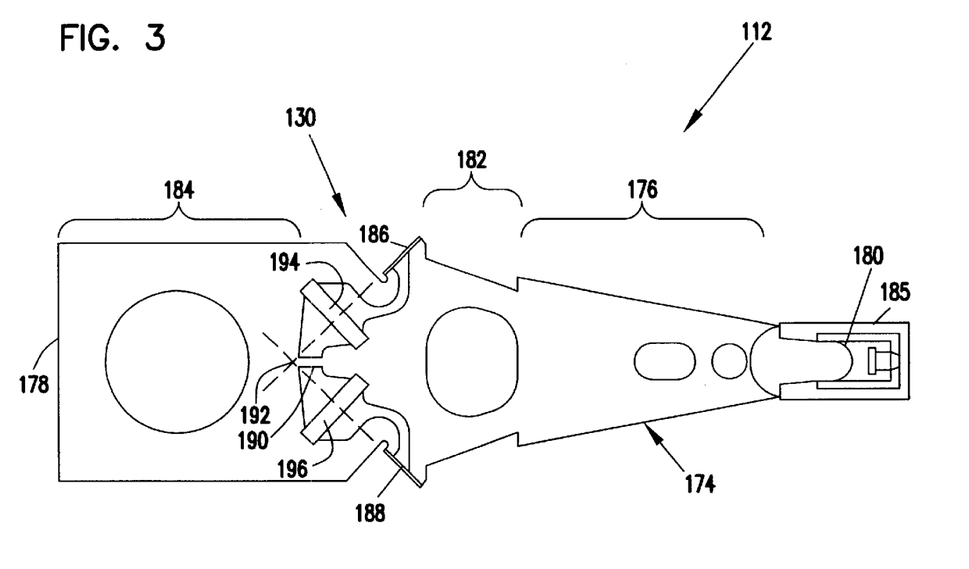
FIG. 3 is a top plan view showing a microactuated suspension in the disc drive having a pair of laterally spaced strips of piezoelectric material.

Microactuator 130 can be positioned at various locations along suspension 112. FIG. 3 is a top plan view showing suspension 112 in greater detail according to one embodiment of the present invention in which each microactuator 130 has a pair of laterally spaced strips 194 and 196 of piezoelectric material. Suspension 112 includes a load beam 174 having a rigid region 176, proximal and distal ends 178 and 180, a spring region 182, a mounting base 184, and a gimbal 185. Spring region 182 is located between mounting base 184 and rigid region 176. Beams 186, 188 and 190 extend between mounting base 184 and spring region 182. Beams 186 and 188 are bent up normal to the plane of the suspension. Lines extending from beams 186 and 188 intersect at a virtual microactuation pivot axis 192.

Microactuator 130 includes piezoelectric elements 194 and 196, which extend between mounting base 184 and a proximal end of the load beam, behind spring region 182 relative to rigid region 176. These elements deform in opposite directions upon application of an applied voltage causing the distal end 180 of the load beam to actuate about virtual pivot axis 192. Piezoelectric elements 194 and 196 move load beam 174, which in turn moves gimbal 185 and the read/write head (not shown). The microactuated suspension shown in FIG. 3 is described in more detail in U.S. application Ser. No. 09/240,116, filed Jan. 29, 1999 and entitled "ACTUATED SUSPENSION LEVEL MICROACTUATOR."

In other embodiments, the piezoelectric elements can be located along other areas of the suspension, and in different configurations. For example, one or more piezoelectric elements can be located within spring region 182, at distal end 180, on gimbal 185 or between gimbal 185 and the read/write head. Also, the piezoelectric elements can be used with various different suspension configurations.

Figure 4:
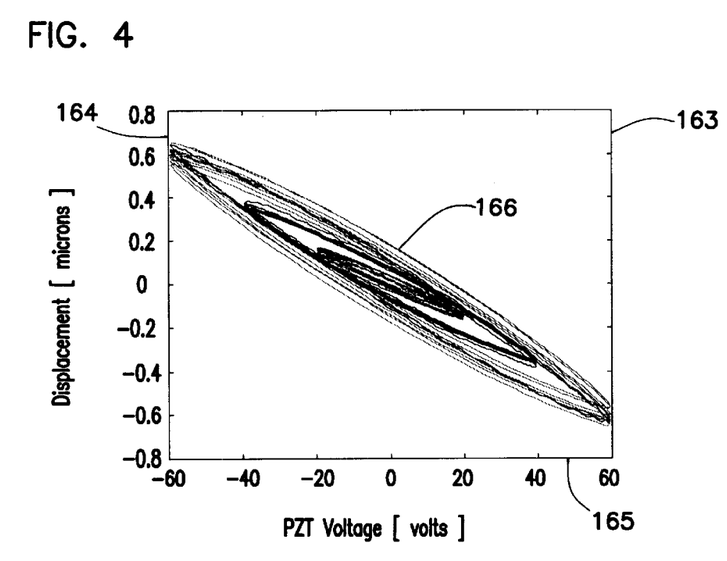
FIG. 4 is a graph illustrating displacement of a typical piezoelectric maternal versus input voltage.

A difficulty experienced with piezoelectric microactuators in disc drive servo systems has been that the piezoelectric material used in these microactuators exhibit hysteresis. FIG. 4 is a graph 163 illustrating displacement of a typical piezoelectric material along axis 164 versus input voltage along axis 165. Each ellipse 166 corresponds to displacement versus amplitude for a fixed peak-to-peak amplitude sign wave input voltage. The hysteresis shown in FIG. 4 limits the accuracy at which a typical microactuator employing piezoelectric crystals can position head 110.

Figure 5:
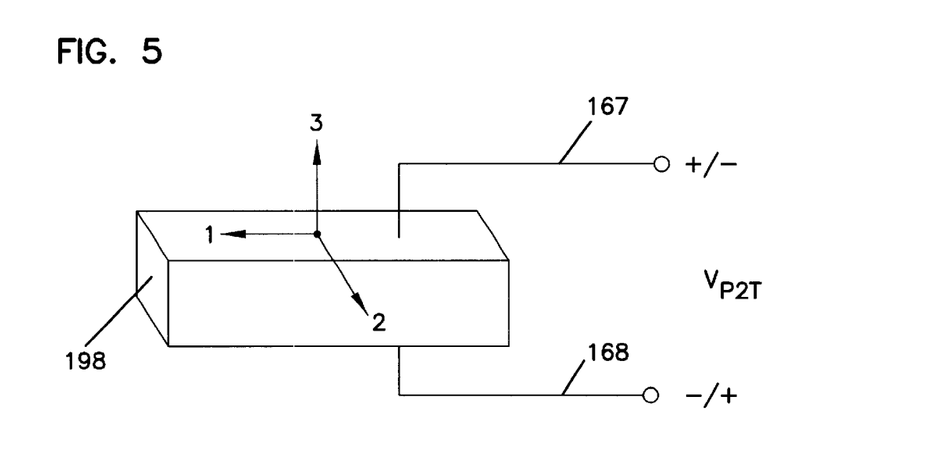
FIG. 5 is a perspective view of a piezoelectric crystal.

To limit hysteresis in microactuator 130, microactuator controller 146 (shown in FIG. 2) uses a charge feedback driver for controlling the charge delivered to the piezoelectric material within microactuator 130, rather than simply controlling the voltage applied to the microactuator. FIG. 5 is a perspective view of a piezoelectric crystal 198. Crystal 198 has three orthogonal axes, labeled "1", "2" and "3". Piezoelectric crystal 198 can be modeled as follows:

$$\Delta\lambda = d_{31} V_{PZT} \qquad \text{Eq. 1}$$

where $\Delta\lambda$ represents the change in length (along the 1—1 axis) of piezoelectric crystal 198, $V_{PZT}$ represents the voltage applied across piezoelectric crystal 198 at terminals 167 and 168 (along the 3—3 axis), and $d_{31}$ is a proportionality constant generally given in picometers per volt for displacement across the 1—1 axis in response to an electric field applied across the 3—3 axis. Other types of piezoelectric material can also be used, such as materials having a $d_{33}$ proportionality constant. It is known that this relationship is not accurate because it does not predict hysteresis. A more accurate model would be:

$$\Delta\lambda = K_{31} Q_{PZT} \qquad \text{Eq. 2}$$

where $K_{31}$ (or "$K_p$") is a proportionality constant in meters per Coulomb indicating displacement along the 1—1 axis in response to the charge $Q_{PZT}$ across the 3—3 axis. This charge model has been generally shown to be more accurate and capable of predicting hysteresis in a piezoelectric crystal. An explanation for the charge model being more accurate lies in an observation that the capacitance of a piezoelectric crystal is not constant, but varies with both applied voltage and absolute length of the crystal.

In a microactuated suspension, $\Delta\lambda$ represents head position, $H_P$, since the head position varies with the length of the piezoelectric crystal. Therefore, the head position $H_P$ is proportional to the charge $Q_{PZT}$ on the piezoelectric crystal. The charge $Q_{PZT}$ equals the capacitance ($C_{PZT}$) of the piezoelectric crystal times the voltage ($V_{PZT}$) applied across the piezoelectric crystal and is equal to the time integral of the current $I_{PZT}$) flowing through the piezoelectric crystal. These relationships are shown in the following equation:

$$H_P/K_p = Q_{PZT} = V_{PZT} C_{PZT} = \int I_{PZT} dt \qquad \text{Eq. 3}$$

Using the relationship that $H_P/K_p = \int I_{PZT} dt$, a microactuator drive circuit an be formed to control the head position $H_P$ as a function of the current delivered through the piezoelectric crystal.

Figure 6:
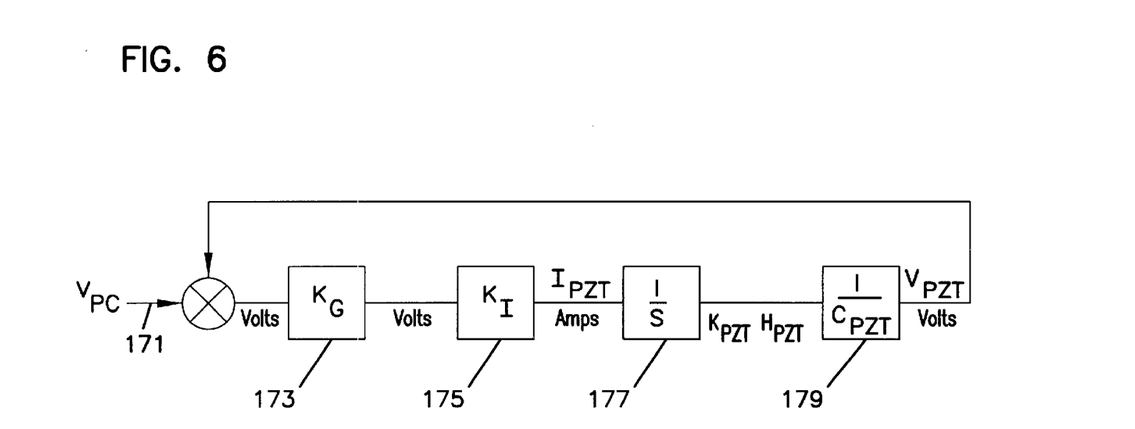
FIG. 6 is a diagram of a head position control loop according to one embodiment of the present invention.

FIG. 6 is a diagram showing an example of a head position control loop, where $V_{PC}$ at input 171 is a voltage representing a position command signal indicating a desired head position, $K_G$ is a voltage gain element 173, $K_I$ is a voltage-current gain constant 175, $I_{PZT}$ is the current delivered through the piezoelectric crystal, 1/S is a LaPlace integral operator 177, $1/C_{PZT}$ at 179 is the inverse of the capacitance of the piezoelectric crystal, and $V_{PZT}$ is the voltage across the piezoelectric element.

Figure 7:
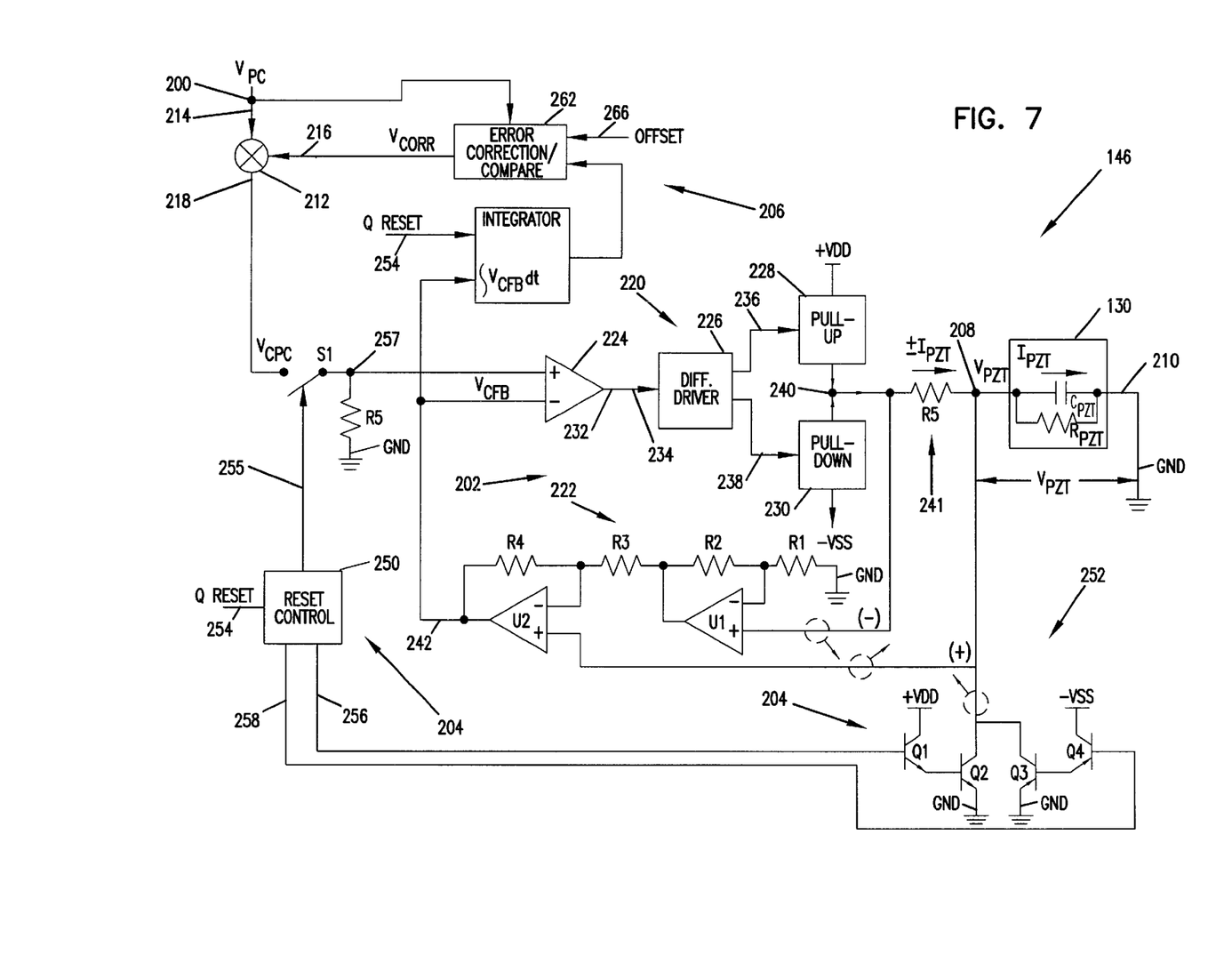
FIG. 7 is a schematic diagram of a microactuator controller, which uses charge feedback control, according to one embodiment of the present invention.

FIG. 7 is a schematic diagram of microactuator controller 146, which uses charge feedback control head position, according to one embodiment of the present invention. Microactuator controller 146 includes a position command input 200, a charge feedback driver 202, a charge reset circuit 204, an error feedback circuit 206 and position control output nodes 208 and 210.

Microactuator 130 is coupled across position control output nodes 208 and 10 210. Microactuator 130 has a piezoelectric element with a capacitance $C_{PZT}$ and a parallel leakage resistance $P_{PZT}$. The current flowing through the capacitance $C_{PZT}$ is labeled $I_{PZT}$. Microactuator controller 146 receives the position command signal $V_{PC}$ on input 200, which is a voltage having a magnitude and polarity indicative of a desired head position. A summing element 212 receives the position command voltage $V_{PC}$ on sum input 214 and sums the position command voltage $V_{PC}$ with a correction voltage $V_{CORR}$ received on sum input 216 to generate a corrected position command voltage $V_{CPC}$ on sum output 218. The corrected position command voltage is passed to charge feedback driver 202 through reset switch S1, which is normally closed.

Charge feedback driver 202 includes a charge driver circuit 220 and a charge feedback circuit 222. Charge driver circuit 220 includes operational amplifier 224, differential driver circuit 226, pull-up circuit 228 and pull-down circuit 230. Operational amplifier 224 has a non-inverting input, which is coupled to reset switch S1, and an inverting input coupled to charge feedback circuit 222 for receiving a charge feedback voltage $V_{CFB}$. Operational amplifier 224 compares $V_{CFB}$ with $V_{CPC}$ and generates an error voltage on output 232. The error voltage is applied to input 234 of differential driver circuit 226, which generates pull-up and pull-down control signals 236 and 238 that are applied to pull-up circuit 228 and pull-down circuit 230, respectively. Pull-up circuit 228 is coupled between positive voltage supply terminal +VDD and node 240 for sourcing current $I_{PZT}$ through node 240. Pull-down circuit 230 is coupled between node 240 and negative voltage supply terminal −VSS for sinking circuit $I_{PZT}$ from node 240. Node 240 is coupled to position control output node 208, through sensing resistor $R_S$. The magnitude and polarity of current $I_{PZT}$ determines the charge stored on capacitance $C_{PZT}$ of piezoelectric microactuator 130 and thus the position of the head (not shown) that is actuated by microactuator 130.

Charge feedback circuit 222 includes an input 241 formed by sensing resistor $R_S$, precision operational amplifiers U1 and U2, resistors R1–R4, and an output 242. In this embodiment, charge feedback circuit 222 forms a differential voltage measurement circuit. Current sensing resistor $R_S$ is coupled in series with the position control output defined by nodes 208 and 210 and develops a voltage drop ($V_{PZT}-V_D$), which is proportional to the current $I_{PZT}$ delivered into or out of microactuator 130. The non-inverting input of amplifier U1 is coupled to node 240, and the inverting input of amplifier U1 is coupled to ground terminal GND through resistor R1. Resistor R2 is coupled between the output of amplifier U1 and the inverting input of amplifier U1. The output of amplifier U1 is coupled to the inverting input of amplifier U2 through resistor R3. Resistor R4 is coupled between the inverting input of amplifier U2 and the output of amplifier U2. The non-inverting input of amplifier U2 is coupled to position control output node 208. Operational amplifiers U1 and U2 have a high input impedance to minimize leakage current. To further minimize leakage current, guard conductors 244 can be routed along the conductors leading from nodes 240 and 208. The output of amplifier U2 generates the charge feedback voltage $V_{CFB}$ as a function of the voltage drop $V_{PZT}-V_D$ across sensing resistor $R_S$, according to the relation:

$$V_{CFB}=A_V[V_{PZT}-V_D] \qquad \text{Eq. 4}$$

where $A_V$ is the gain of the voltage measurement circuit. The gain is given by, $$A_V=[1+R1/R2] \qquad \text{Eq. 5}$$

where R1=R4, R2=R3, and R1, R2, R3 and R4 are the resistances of resistors R1, R2, R3 and R4, respectively. The charge feedback voltage $V_{CFB}$ represents the current $I_{PZT}$ delivered to the piezoelectric element of microactuator 130, according to the relation, $$V_{CFB}=I_{PZT}R_S \qquad \text{Eq. 6}$$

Operational amplifier 224 amplifies the output voltage on output 232 to force the feedback voltage $V_{CFB}$ to equal the corrected position command voltage $V_{CPC}$ and thereby control the charge on the piezoelectric element of microactuator 130.

In one embodiment, $I_{PZT}$ is selected to have a maximum amplitude of ±0.1 Amps, $R_S$=10.0 Ohms, $R_1=R_4$=82.5K Ohms, $R_2=R_3$=7.5K Ohms, $A_V$=12.0 and $V_{CFB}$=±12 volts, for example. Other circuit values and driving currents can be used in alternative embodiments. Charge feedback circuit 222 is merely one example of a feedback circuit that can be used with the present invention. Other feedback circuits can also be used for generating a feedback signal which is representative of the charge delivered to and from microactuator 130.

Charge reset circuit 204 includes charge reset input 254, reset control circuit 250, reset switch S1, resistor R5 and pull-down circuit 252. Reset circuit 204 enables the charge stored on capacitance $C_{PZT}$ to be selectively reset to zero through a reset command QRESET received on charge reset input 254. Reset control circuit 250 supplies a switch control signal 255 to reset switch S1 such that switch S1 is closed when QRESET is inactive and open when QRESET is active. Reset control circuit 250 also supplies reset control signals 256 and 258 to pull-down circuit 252. Pull-down control circuit 252 includes transistors Q1–Q4, which act as a switch for selectively shorting voltage $V_{PZT}$ to ground terminal GND (i.e. shorting output nodes 208 and 210). Reset control signal 256 is coupled to the base of transistor Q1, and reset control signal 258 is coupled to the base of transistor Q4. The collector of transistor Q1 is coupled to positive voltage supply terminal +VDD, and the emitter of transistor Q1 is connected to the base of transistor Q2. The emitter of transistor Q2 is connected to ground terminal GND, and the collector of transistor Q2 is coupled to position control output node 208. Similarly, the collector of transistor Q4 is coupled to negative voltage supply terminal −VSS, and the emitter of transistor Q4 is coupled to the base of transistor Q3. The collector of transistor Q3 is coupled to position control output node 208, and the emitter of transistor Q3 is coupled to ground terminal GND. The voltage $V_{PZT}$ on node 208 is anticipated to be a bipolar voltage, which is sourced from pull-up and pull-down circuits 228 and 230 using positive voltage (+VDD) or negative voltage (-VSS).

When QRESET is active, reset control circuit 250 opens reset switch S1 and turns on transistors Q1–Q4. With reset switch S1 open, the non-inverting input of differential amplifier 224, at node 257, is pulled to ground terminal GND (e.g. zero) through resistor R5. Operational amplifier 224, through charge feedback circuit 222, forces $V_{CFB}$ and $V_D$ to be at the same, zero potential as node 257. With transistors Q1–Q4 on, node 208 is pulled to ground terminal GND such that $V_{PZT}$ is also equal to zero. This effectively shorts the two input terminals of piezoelectric microactuator 130 together at ground, thereby discharging capacitance $C_{PZT}$. Any pre-existing bias or offset on the piezoelectric element is thereby removed, returning the piezoelectric element to its null position.

QRESET can be selectively activated at desired times during the regular operation of the disc drive. For example, the piezoelectric elements can be reset during seek operations when actuator 116 (shown in FIGS. 1–2) moves heads 110 from one data track to another data track. The piezoelectric elements can also be reset during initialization when the disc drive is turned on and at other desired times.

When QRESET returns to the inactive state, reset control circuit 250 turns off transistors Q1–Q4, thereby eliminating the short of $V_{PZT}$ to ground, and closes reset switch S1 to allow the charge feedback driver 202 to drive microactuator 130 as a function of the corrected position command signal $V_{CPC}$ and the actual charge delivered to the microactuator. At this point, the correction voltage $V_{CORR}$ is zero, and error feedback circuit 206 begins calculating the appropriate value for $V_{CORR}$.

Error feedback circuit 206 includes integrator 260 and error correction/comparator circuit 262. The charge feedback voltage $V_{CFB}$ is applied to integrator 260 along with the charge reset command QRESET from reset input 254. When QRESET becomes inactive, integrator 260 begins integrating the charge feedback voltage $V_{CFB}$ with respect to time until the piezoelectric element is fully charged. The selected integration time is based on the time constant of the piezoelectric element. The actual head position $H_P$ (i.e. displacement of microactuator 130) can then be calculated as a function of the time integral of the charge feedback voltage $V_{CFB}$ and then compared with the desired head position represented by the position command voltage $V_{PC}$. Since, $$\frac{1}{R_S}\int V_{CFB}\,dt = \int I_{PZT}\,dt = Q_{PZT}, \qquad \text{Eq. 7}$$

the actual head position $H_P$ can be calculated from the relation, $$H_P = K_{PZT}Q_{PZT} = \frac{K_{PZT}}{R_S}\int V_{CFB}\,dt \qquad \text{Eq. 8}$$

Once integrator 260 has finished integrating $V_{CFB}$, integrator 260 feeds the time integral of $V_{CFB}$ to error correction/comparator circuit 262 and does not further update the measurement until the next reset. Error correction/comparator circuit 262 calculates the actual head position $H_P$ based on the equation above. Circuit 262 also receives the position command voltage $V_{PC}$ from input 200. Since the position command voltage $V_{PC}$ represents a predetermined displacement of the piezoelectric element, circuit 262 converts $V_{PC}$ into a commanded displacement length by multiplying the voltage by a predetermined factor. Circuit 262 then compares the commanded displacement length with the actual displacement length represented by $H_P$ and generates an error correction voltage $V_{CORR}$ based on the difference. The error correction voltage $V_{CORR}$ is applied to sum input 216 and added to the position command voltage $V_{PC}$ to generate the corrected position command voltage $V_{CPC}$.

Error correction voltages can be determined for a number of command position amplitudes. These error correction voltages can be made at convenient times and temperatures. In one embodiment, error correction/comparison circuit 262 further includes an offset input 266 which is added to the error correction signal. Offset input 266 can represent a desired offset that may vary depending upon the radial position of the head or temperature of the disc drive. The various offset values can be stored in a register bank or other memory associated with drive controller 140, servo control processor 142 or microactuator controller 146.

The calculations made by integrator 260 and error correction circuit 262 can be performed by analog circuitry, digital circuitry or a combination of both. Also, any representation of the actual head position can be used to compare with a corresponding representation of the commanded head position in order to generate an appropriate error correction signal. The above-embodiment is given only as an example.

Figure 8:
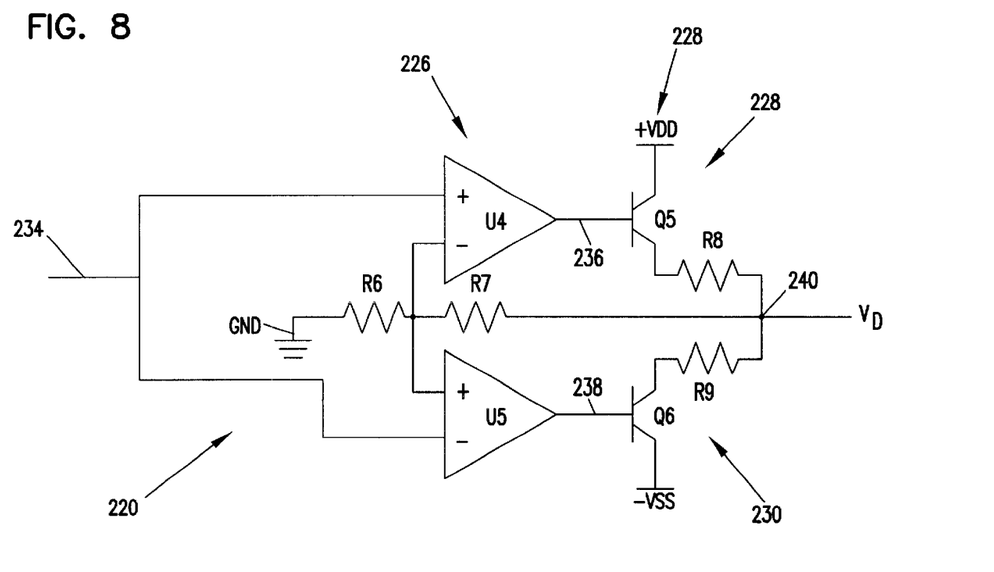
FIG. 8 is a schematic diagram of a differential driver circuit used in the microactuator controller shown in FIG. 7, according to one embodiment of the present invention.

FIG. 8 is a schematic diagram showing differential driver circuit 226, pull-up circuit 228 and pull-own circuit 230 in greater detail according to one embodiment of the present invention. Input 234 is coupled to the non-inverting inputs of operational amplifiers U4 and U5. The inverting inputs of operational amplifiers U4 and U5 are coupled to the node between resistors R6 and R7. Resistor R6 is coupled to ground terminal GND. Resistor R7 is coupled to output node 240. The outputs of operational amplifiers U4 and U5 are coupled to the bases of transistors Q5 and Q6, respectively. The collectors of transistors Q5 and Q6 are coupled to positive voltage supply terminal +VDD and negative voltage supply terminal -VSS, respectively. The emitters of transistors Q5 and Q6 are connected to output 240 through resistors R8 and R9, respectively. During operation, transistor Q5 sources current from voltage supply terminal +VDD or transistor Q6 sinks current to negative voltage supply terminal -VSS, depending on the voltage applied to input 234.

In one embodiment, R6=1020 Ohms, R7=340 Ohms, R8=1.0 Ohms and R9=1.0 Ohms. Amplifiers U4 and U5 are driven between +27V and -27V to provide a high drive voltage for transistors Q5 and Q6. Amplifiers U4 and U5 have a gain of 1+R4/R5=1.33. Operational amplifiers U4 and U5 are highly linear and have minimal crossover distortion. For example, operational amplifiers U4 and U5 can include OPA445 amplifiers from Burr-Brown Corporation. Other types of operational amplifiers, transistors and component values can be used in alternative embodiments, and other driver configurations can be used for supplying current to piezoelectric microactuator 130 as a function of a control voltage or current.

In the embodiment shown in FIGS. 7–8, charge feedback control is accomplished by controlling the current delivered to the piezoelectric element in microactuator 130. In an alternative embodiment, charge feedback control is accomplished by controlling the charge on a reference capacitor and then "mirroring" the charge on to the piezoelectric element, generally by passing the same charging current through the piezoelectric element.

Figure 9:
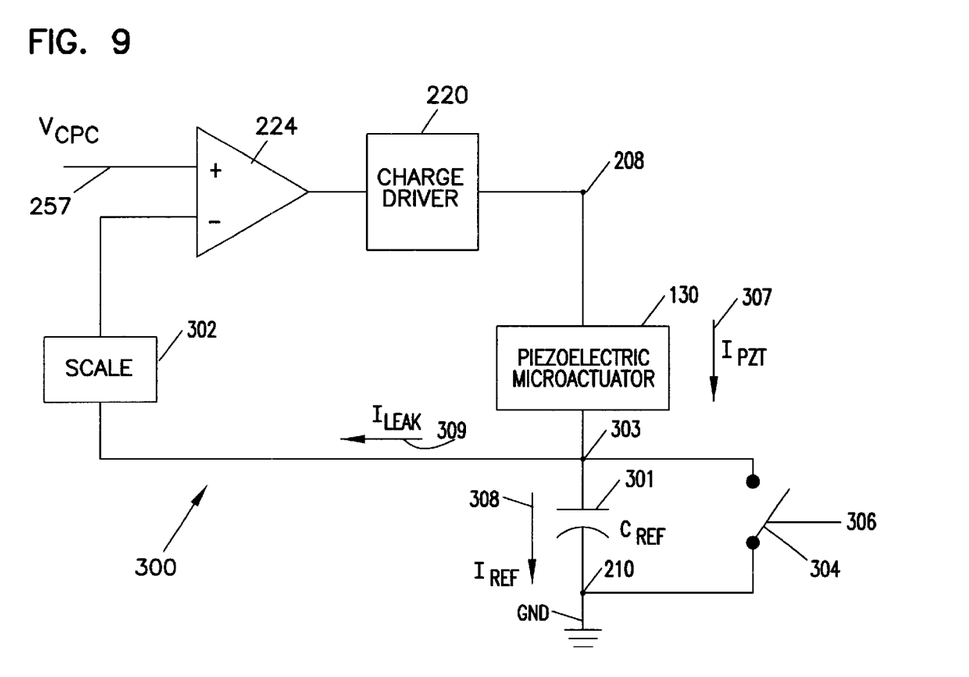
FIG. 9 is a schematic diagram of a charge feedback driver, which mirrors the charge from a reference capacitor into a piezoelectric crystal, according to an alternative embodiment of the present invention.

FIG. 9 is a schematic diagram of a charge feedback driver 300 using one technique for mirroring the charge from a reference capacitor. The same reference numerals are used in FIG. 9 as were used in FIGS. 7–8 for the same or similar elements. Driver 300 includes operational amplifier 224, charge driver circuit 220, piezoelectric microactuator 130, reference capacitor $C_{REF}$, at reference numeral 301, and voltage scaling circuit 302. Piezoelectric microactuator 130 is coupled in series with reference capacitor $C_{REF}$, between position control output nodes 208 and 210 (i.e. ground terminal GND). The charging current $I_{PZT}$ indicated by arrow 307 driven through piezoelectric microactuator 130 is substantially equal to the reference current $I_{REF}$, indicated by arrow 308, through reference capacitor $C_{REF}$, as long as the input leakage current $I_{LEAK}$, indicated by arrow 309, of amplifier 224 is negligible.

The charge delivered to reference capacitor $C_{REF}$ is given by, $$Q_{REF} = C_{REF} V_{CPC} = \int I_{REF} dt \qquad \text{Eq. 9}$$

The charge delivered to piezoelectric microactuator 130 is given by, $$Q_{PZT} = \int I_{PZT} dt \qquad \text{Eq. 10}$$

$$= \int (I_{REF} + I_{LEAK}) dt \qquad \text{Eq. 11}$$

$$= \int I_{REF} dt + \int I_{LEAK} dt \qquad \text{Eq. 12}$$

$$= Q_{REF} + Q_{LEAK} \qquad \text{Eq. 13}$$

Thus, the charge delivered to reference capacitor $C_{REF}$ is substantially equal to the charge delivered to piezoelectric microactuator 130, as long as the input leakage current $I_{LEAK}$ is negligible. The charge on piezoelectric microactuator 130 can therefore be controlled by controlling the charge on reference capacitor $C_{REF}$. This charge is controlled by feeding the voltage developed across $C_{REF}$ back to the inverting input of operational amplifier 224, through voltage scaling circuit 302.

Driver 300 can further include a switch 304 coupled across reference capacitor $C_{REF}$. Switch 304 has a control terminal 306 which is operated by reset control circuit 250 (shown in FIG. 7) to resetting the charge on reference capacitor $C_{REF}$ when QRESET is active.

Figure 10:
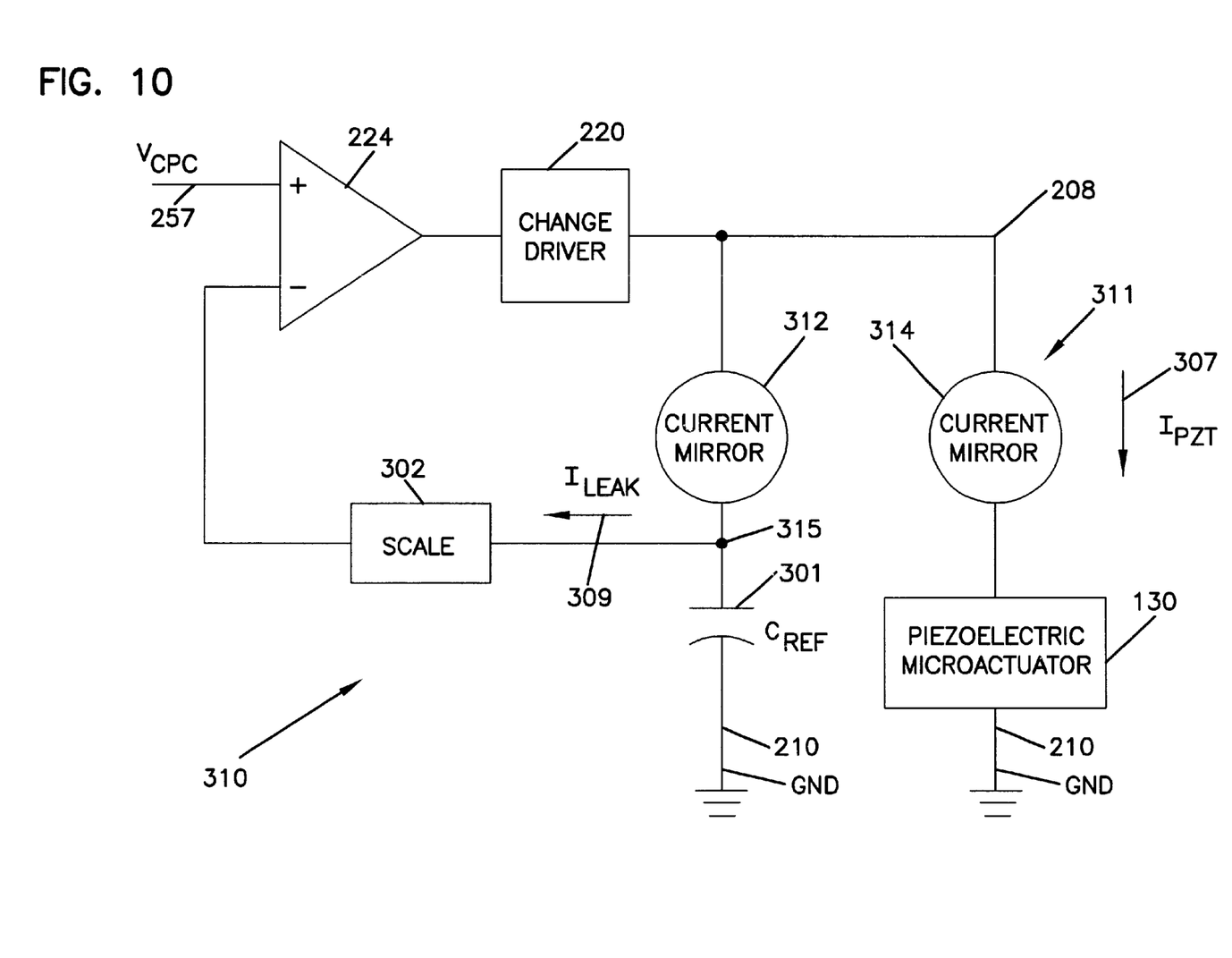
FIG. 10 is a schematic diagram of a charge feedback driver, according to another alternative embodiment of the present invention.

FIG. 10 is a schematic diagram of a charge feedback driver 310 according to another alternative embodiment of the present invention. Again, the same reference numerals are used in FIG. 10 as were used in FIGS. 7–8 for the same or similar elements. In this embodiment, driver 310 includes a current mirror 311 having a first leg 312 and a second leg 314. Reference capacitor $C_{REF}$ is charged through first leg 312, and piezoelectric microactuator 130 is charged through the second leg 314. The current ($I_{PZT}$) delivered to piezoelectric microactuator 130 is given by, $$I_{PZT} = k_M (I_{REF} + I_{LEAK}) \qquad \text{Eq. 14}$$

where $k_M$ is the gain of the current mirror from leg 312 to leg 314. The charge on reference capacitor $C_{REF}$ is given by, $$Q_{REF} = \int I_{REF} dt \qquad \text{Eq. 15}$$

The charge on piezoelectric microactuator 130 is given by, $$Q_{PZT} = \int I_{PZT} dt \qquad \text{Eq. 16}$$

$$= \int k_M (I_{REF} + I_{LEAK}) dt \qquad \text{Eq. 17}$$

$$= k_M \int I_{REF} dt + k_M \int I_{LEAK} dt \qquad \text{Eq. 18}$$

$$= k_M Q_{REF} + k_M Q_{LEAK} \qquad \text{Eq. 19}$$

As long as the leakage current $I_{LEAK}$ at node 315 is small (and also leakage current of piezoelectric crystal is small and well controlled), the charge on reference capacitor $C_{REF}$ will accurately represent the charge on the piezoelectric crystal.

In summary, one aspect of the present invention relates to a disc drive head positioning apparatus 100 which includes a head 110, a suspension 112 which supports the head 110, a piezoelectric microactuator 130 which is operatively coupled to the suspension 112, and a charge feedback driver 202 which is operatively coupled to the piezoelectric microactuator 130.

In one embodiment, the charge feedback driver 202 includes a position command input 200 for receiving a position command signal $V_{PC}$, a position control output 208, 210, a charge driver circuit 220 and a charge feedback circuit 222. The position control output 208, 210 is coupled across the piezoelectric microactuator 130. The charge driver circuit 220 is coupled between the position command input 200 and the position control output 208, 210. The charge feedback circuit 222 has a charge feedback input 241 coupled to the position control output 208, 210 and a charge feedback output 242 coupled to the charge driver circuit 220. The charge feedback circuit 222 is adapted to sense charge $Q_{PZT}$ delivered to the microactuator 130 through the position control output 208, 210.

The charge feedback circuit 222 can include a current sensing resistor $R_S$, which is coupled in series with the position control output 208, 210 and forms the charge feedback input 241, and a differential voltage measurement circuit, which is coupled across the current sensing resistor $R_S$ and has a voltage feedback output $V_{CFB}$ which is coupled to the charge feedback output 242.

The driver circuit 220 includes an operational amplifier 224, U4, U5, a pull-up transistor Q5 and a pull-down transistor Q6. The operational amplifier has first and second amplifier inputs which are coupled to the position command input 200 and the charge feedback output 242, respectively, and an amplifier output 236, 238. The pull-up transistor Q5 is coupled to a first terminal 208 of the position control output and has a control terminal which is coupled to the amplifier output 236. The pull-down transistor Q6 is coupled to the first terminal of the position control output 208 and has a control terminal which is coupled to the amplifier output 238.

The disc drive head positioning apparatus 100 can further include a charge reset circuit 204, which has a charge reset command input 254, and first and second switches S1, Q1–Q4. The reset command input 254 receives a reset signal QRESET having an active state and an inactive state. The first switch S1 is coupled between the position control input 200 and the charge driver circuit 220 and has a closed state when the reset signal QRESET is in the inactive state and an open state when the reset signal QRESET is in the active state. The second switch Q1–Q4 is coupled across the microactuator 130 and has an open state when the reset signal QRESET is in the inactive state and a closed state when the reset signal QRESET is in the active state.

The disc drive head positioning apparatus 100 can further include an error feedback circuit 206 coupled between the charge feedback output 242 and the position command input 200. The error feedback circuit 206 includes an integrator 260, an error correction circuit 262 and a summing element 212. The integrator 260 integrates the charge feedback output 242 for a selected time period and generates an integrator output that represents the charge delivered to the piezoelectric microactuator 130. The error correction circuit 262 is coupled to the integrator output and to the position control input 200 and is adapted to generate a correction signal $V_{CORR}$ that represents a comparison between a commanded displacement of the piezoelectric microactuator 130 corresponding to the position command signal and an actual displacement of the piezoelectric microactuator 130 corresponding to the integrator output. The summing element 212 sums the position command signal $V_{PC}$ and the correction signal $V_{CORR}$ to generate a corrected position command signal $V_{CPC}$ that is applied to the driver circuit 220. The error correction circuit 262 can further include an offset control input 266, wherein the correction signal $V_{CORR}$ is adjustable through the offset control input 266.

In an alternative embodiment, the charge feedback circuit 300 includes a reference capacitor $C_{REF}$, 301, and a voltage feedback amplifier 224. The reference capacitor $C_{REF}$ is coupled in series with the piezoelectric microactuator 130, between first and second terminals 208, 210 of the position control output, and forms a reference node 303 therebetween. The voltage feedback amplifier 224 has a non-inverting input coupled to the position command input 200, an inverting input coupled to the reference node, and an output coupled to the driver circuit 220.

In another alternative embodiment, the charge feedback circuit 310 includes a voltage feedback amplifier 224 and a current mirror 311. The voltage feedback amplifier 224 has an inverting input, a non-inverting input coupled to the position command input 200, and an output coupled to the driver circuit 220. The current mirror 311 has first and second legs 312, 314, wherein the first leg 312 is coupled in series with a reference capacitor $C_{REF}$ across the position control output 208, 210, the second leg 314 is coupled in series with the microactuator 130 across the position control output 208, 210, and the inverting input is coupled to a reference node 315 between the reference capacitor $C_{REF}$ and the first leg 312.

Another aspect of the present invention relates to a method of controlling radial position of a head 110 relative to a storage medium 162 in a disc drive 100. The method includes supporting the head 110 relative to the storage medium 162, and receiving a position command signal $V_{PC}$ indicative of a commanded radial position for the head 110. Based on the position command signal $V_{PC}$, a microactuator drive signal $I_{PZT}$ is generated and used to vary an actual radial position of the head 110 through a piezoelectric microactuator 130. A representation of the charge $Q_{PZT}$ delivered to the piezoelectric microactuator 130 by the drive signal is measured, and the microactuator drive signal $I_{PZT}$ is varied based on the measured representation of the charge $Q_{PZT}$.

Another aspect of the present invention relates to a disc drive head positioning apparatus 100, which includes a head 110 and a microactuator 130. The microactuator 130 controls a radial position of the head 110 relative to a storage medium 162 through a piezoelectric microactuator element based on a position command signal $V_{PC}$ and a representation of the charge $Q_{PZT}$ delivered to the piezoelectric microactuator element.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, various other charge feedback driver circuits can be used without departing from the scope and spirit of the present invention. In addition, the term "coupled" used in the specification and the claims can include a direct connection or a connection through one or more intermediate components. The transistors shown in the various embodiments can include any suitable transistor type, such as bipolar junction transistors (BJTs) or field effect transistors (FETs), for example.

What is claimed is:

1. A disc drive head positioning apparatus comprising:
   a head;
   a suspension which supports the head;
   a piezoelectric microactuator which is operatively coupled to the suspension; and
   a charge feedback driver which is operatively coupled to the piezoelectric microactuator.

2. The disc drive head positioning apparatus of claim 1 and further comprising:
   a charge reset circuit which is coupled to the piezoelectric microactuator.

3. The disc drive head positioning apparatus of claim 1 wherein the charge feedback driver comprises:
   a position command input for receiving a position command signal;
   a position control output which is coupled across the piezoelectric microactuator;
   a charge driver circuit which is coupled between the position command input and the position control output; and
   a charge feedback circuit which has a charge feedback input coupled to the position control output and a charge feedback output coupled to the charge driver circuit and is adapted to sense charge delivered to the microactuator through the position control output.

4. The disc drive head positioning apparatus of claim 3 wherein the charge feedback circuit comprises:
   a current sensing resistor which is coupled in series with the position control output and forms the charge feedback input; and
   a voltage measurement circuit which is coupled across the current sensing resistor and has a voltage feedback output which is coupled to the charge feedback output.

5. The disc drive head positioning apparatus of claim 3 wherein the driver circuit comprises:
   an operational amplifier comprising first and second amplifier inputs which are coupled to the position command input and the charge feedback output, respectively, and an amplifier output;
   a pull-up transistor which is coupled to a first terminal of the position control output and has a control terminal which is coupled to the amplifier output; and
   a pull-down transistor which is coupled to the first terminal of the position control output and has a control terminal which is coupled to the amplifier output.

6. The disc drive head positioning apparatus of claim 3 and further comprising:

a charge reset circuit, which comprises a charge reset command input for receiving a reset signal having an active state and an inactive state, a first switch coupled between the position control input and the charge driver circuit and having a closed state when the reset signal is in the inactive state and an open state when the reset signal is in the active state, and a second switch coupled across the microactuator and having an open state when the reset signal is in the inactive state and a closed state when the reset signal is in the active state.

7. The disc drive head positioning apparatus of claim 3 and further comprising:

an error feedback circuit coupled between the charge feedback output and the position command input.

8. The disc drive head positioning apparatus of claim 7 wherein the error feedback circuit comprises:

an integrator which integrates the charge feedback output for a selected time period and generates an integrator output that represents the charge delivered to the piezoelectric microactuator;

an error correction circuit which is coupled to the integrator output and to the position control input and is adapted to generate a correction signal that represents a comparison between a commanded displacement of the piezoelectric microactuator corresponding to the position command signal and an actual displacement of the piezoelectric microactuator corresponding to the integrator output; and a summing element which sums the position command signal and the correction signal to generate a corrected position command signal that is applied to the driver circuit.

9. The disc drive head positioning apparatus of claim 8 wherein the error correction circuit has an offset control input and the correction signal is adjustable through the offset control input.

10. The disc drive head positioning apparatus of claim 3 wherein the charge feedback circuit comprises:

a reference capacitor coupled in series with the piezoelectric microactuator, between first and second terminals of the position control output, and forming a reference node therebetween; and a voltage feedback amplifier comprising a non-inverting input coupled to the position command input, an inverting input coupled to the reference node, and an output coupled to the driver circuit.

11. The disc drive head positioning apparatus of claim 3 wherein the charge feedback circuit comprises:

a voltage feedback amplifier comprising an inverting input, a non-inverting input coupled to the position command input, and an output coupled to the driver circuit; and a current mirror having first and second legs, wherein the first leg is coupled in series with a reference capacitor across the position control output, the second leg is coupled in series with the microactuator across the position control output, and the inverting input is coupled to a reference node between the reference capacitor and the first leg.

12. A method of controlling radial position of a head relative to a storage medium in a disc drive, the method comprising steps:

(a) supporting the head relative to the storage medium;

(b) receiving a position command signal indicative of a commanded radial position for the head;

(c) generating a microactuator drive signal based on the position command signal;

(d) varying an actual radial position of the head through a piezoelectric microactuator based on the microactuator drive signal;

(e) measuring a representation of the charge delivered to the piezoelectric microactuator by the drive signal; and (f) varying the microactuator drive signal based on the measured representation of the charge.

13. The method of claim 12 and further comprising:

(g) selectively resetting charge stored on the piezoelectric microactuator.

14. The method of claim 12 wherein:

the measuring step (e) comprises measuring current delivered to the microactuator through a sensing resistor and converting the measured current to a feedback voltage; and the varying step (f) comprises amplifying the drive signal based on a difference between the feedback voltage and a voltage representative of the position command signal.

15. The method of claim 14 and further comprising:

(g) integrating the feedback voltage for a selected time period to generated an integrated feedback voltage;

(h) generating a correction signal based on a comparison between the commanded radial position indicated by the position command signal and an actual radial position of the head corresponding to the integrated feedback voltage; and (i) summing the correction signal with the position command signal to generate a corrected position command signal, wherein the generating step (c) comprises generating the microactuator drive signal based on the corrected position command signal.

16. The method of claim 15 and further comprise, (j) adjusting the correction signal based on temperature.

17. The method of claim 15 and further comprises:

(j) adjusting the correction signal based on the commanded radial position.

18. The method of claim 12 wherein:

the varying step (d) comprises applying the drive signal through a series connection of the piezoelectric microactuator and a reference capacitor;

the measuring step (e) comprises measuring a reference voltage developed across the reference capacitor; and the varying step (f) comprises amplifying the drive signal based on a difference between the reference voltage and a voltage representative of the position command signal.

19. The method of claim 12 wherein:

the varying step (d) comprises applying the drive signal through a reference capacitor and mirroring the drive signal into the piezoelectric microactuator;

the measuring step (e) comprises measuring a reference voltage developed across the reference capacitor; and the varying step (f) comprises amplifying the drive signal based on a difference between the reference voltage and a voltage representative of the position command signal.

20. A disc drive head positioning apparatus comprising:

a head; and microactuator means for controlling radial position of the head relative to a storage medium through a piezoelectric microactuator element based on a position command signal and a representation of charge delivered to the piezoelectric microactuator element.

* * * * *

UNITED STATES PATENT AND TRADEMARK OFFICE
CERTIFICATE OF CORRECTION

PATENT NO.    : 6,504,669 B1
DATED         : January 7, 2003
INVENTOR(S)   : Janz et al.

It is certified that error appears in the above-identified patent and that said Letters Patent is hereby corrected as shown below:

<u>Title page, Item [54] and Column 1, lines 1 and 2,</u>
Change title from "DISC DRIVE HAVING CHARGE FEEDBACK DRIVE MICROACTUATOR" to -- DISC DRIVE HAVING CHARGE FEEDBACK DRIVEN MICROACTUATOR --.

<u>Column 6,</u>
Line 62, Equation 3, change "$H_P/K_P = Q_{PZT} = V_{PZT}C_{PZT} = \int I_{PZT} dt$" to -- $H_P/K_P = Q_{PZT} = V_{PZT}C_{PZT} = \int I_{PZT} dt$ --.

<u>Column 16,</u>
Line 34, change "comprise," to -- comprising: --.
Line 36, change "comprises" to -- comprising --.

Signed and Sealed this

Thirteenth Day of May, 2003

JAMES E. ROGAN
*Director of the United States Patent and Trademark Office*